United States Patent
Shugar et al.

(10) Patent No.: US 6,586,668 B2
(45) Date of Patent: Jul. 1, 2003

(54) ELECTRIC VEHICLE WITH PHOTOVOLTAIC ROOF ASSEMBLY

(75) Inventors: Daniel S. Shugar, San Bruno, CA (US); Thomas L. Dinwoodie, Piedmont, CA (US); Steven T. Slavsky, Natick, MA (US)

(73) Assignee: Powerlight Corporation, Berkeley, CA (US)

( * ) Notice: Subject to any disclaimer, the term of this patent is extended or adjusted under 35 U.S.C. 154(b) by 0 days.

(21) Appl. No.: 09/785,665

(22) Filed: Feb. 16, 2001

(65) Prior Publication Data

US 2001/0039960 A1 Nov. 15, 2001

Related U.S. Application Data

(63) Continuation-in-part of application No. 09/494,068, filed on Jan. 28, 2000, now Pat. No. 6,313,394.
(60) Provisional application No. 60/118,943, filed on Feb. 5, 1999.

(51) Int. Cl.[7] ................... H01L 31/042; B60K 1/00
(52) U.S. Cl. ............... 136/244; 136/251; 136/291; 180/2.2; 180/167; 180/168; 180/65.1; 180/65.3; 296/210; 296/211; 296/37.7
(58) Field of Search ............... 136/244, 251, 136/291; 180/2.2, 167, 168, 65.1, 65.3; 296/211, 210, 37.7

(56) References Cited

U.S. PATENT DOCUMENTS

| | | |
|---|---|---|
| 4,181,188 A | 1/1980 | Dessert |
| 4,218,889 A | 8/1980 | Buell |
| 4,332,415 A | 6/1982 | Williams |
| 4,371,934 A | 2/1983 | Wahl et al. |
| 4,517,403 A | 5/1985 | Morel et al. |
| 4,592,436 A | 6/1986 | Tomei |
| 4,650,238 A | 3/1987 | Healey |
| 4,663,495 A | 5/1987 | Berman et al. |
| 4,744,430 A | 5/1988 | McCoy |
| 4,772,065 A | 9/1988 | Nakata et al. |
| 4,773,695 A | 9/1988 | Jones et al. |
| 4,792,175 A | 12/1988 | Gerber |
| 5,094,500 A | 3/1992 | Maypole et al. |
| D330,350 S | 10/1992 | Maypole et al. |
| 5,379,753 A * | 1/1995 | Noennich ............ 126/608 |
| 5,534,759 A | 7/1996 | Evans et al. |
| 5,680,907 A | 10/1997 | Weihe |
| 5,724,824 A | 3/1998 | Parsons |
| 5,725,062 A | 3/1998 | Fronek |
| D394,637 S | 5/1998 | Camiano |
| 5,772,272 A | 6/1998 | Faddis |
| 6,155,635 A * | 12/2000 | Wecker ............ 296/211 |
| 6,283,542 B1 * | 9/2001 | Patz ............ 296/211 |
| 6,313,394 B1 * | 11/2001 | Shugar et al. ............ 136/244 |
| 6,331,031 B1 * | 12/2001 | Parz et al. ............ 296/211 |
| 2002/0011595 A1 * | 1/2002 | Van den Berg ............ 256/40 |

FOREIGN PATENT DOCUMENTS

| | | |
|---|---|---|
| JP | 58-56943 A | 4/1983 |
| JP | 63-71420 A | 3/1988 |
| WO | 87/02512 | 4/1987 |

* cited by examiner

*Primary Examiner*—Alan Diamond
(74) *Attorney, Agent, or Firm*—James F. Hann; Haynes Beffel & Wolfeld LLP

(57) ABSTRACT

A PV roof assembly (6) includes a roof (12) mountable to an electric vehicle (4), and a PV assembly (10) at the upper part of the roof. The PV assembly may be mounted to a separate roof surface (34) or the PV assembly may itself constitute all or part of the roof. The vehicle may include a secondary PV assembly (96) coupled to a display unit (92) to provide an independent indication of the intensity of solar irradiation. The roof may have mounting element recesses (68) to accommodate mounting elements (70) of the PV assembly, the mounting elements configured so as not to shade the PV panel (14). The roof may be configured to accommodate a global positioning device (80). The roof preferably includes a peripheral gutter (88). The roof body preferably includes hand-hold recesses (90) housing hand-hold elements (42) at positions to provide a horizontal setback (92) from the lateral sides (93) of the roof body.

9 Claims, 12 Drawing Sheets

ELECTRIC VEHICLE WITH PHOTOVOLTAIC ROOF ASSEMBLY

CROSS-REFERENCE TO RELATED APPLICATIONS

This is a continuation in part of U.S. patent application Ser. No. 09/494,068 filed Jan. 28, 2000, now U.S. Pat. No. 6,313,394 which claims the benefit of Provisional Patent Application No. 60/118,943, filed Feb. 5, 1999.

BACKGROUND OF THE INVENTION

Smaller electrically powered vehicles, typically called electric cars or electric carts, are widely used on golf courses and for a variety of electric utility vehicle applications. Although electric golf cars have become widely accepted, they typically require recharging after about to 36 holes of golf. Therefore, a typical 18 hole golf course requires about 80 cars to serve the golfers each day and a building large enough to house all the golf cars at night, during which they are commonly recharged. The recharging process not only takes time, but recharging during daytime hours can significantly increase the cost of electricity as a result of increasing peak demand charges from the utility to the customer.

SUMMARY OF THE INVENTION

The present invention relates to several aspects of an electric vehicle with a photovoltaic (PV) roof assembly which permits the batteries on an electric vehicle, typically referred to as an electric car or electric cart, to be charged during operation resulting in several benefits. These benefits include extending the range of the electric car because the batteries are charged during operation. The cost of using electricity from the utility to charge the cars is reduced because the batteries are typically at least partially charged by the solar charging during use. The battery life of the car can be extended because the depth of discharge can be reduced during normal use of the car. By increasing the length of time required between charges, labor costs incurred in the process of charging the batteries are reduced. Cars can be used more efficiently, thus possibly reducing the number of cars required by the facility. Finally, there are also benefits to the environment resulting from the reduced use of electricity from the electric utility and the potential need for fewer cars.

A first aspect of the invention is directed to an electric vehicle of the type including a vehicle body carrying a motor, a battery and a main PV assembly, the main PV assembly being coupled to the battery so to charge to battery. This improved electric vehicle includes a display unit mounted to the body, the display unit being electrically isolated from the battery and the main PV assembly. A secondary PV assembly is mounted to the body and is electrically connected to the display unit so the display unit provides an indication proportional to the intensity of the solar irradiation on the secondary PV assembly.

Another aspect of the invention is directed to an electric vehicle PV roof assembly including a vehicle roof comprising an upper surface having a number of assembly mounting element recesses. A PV assembly is secured to the upper surface of the roof of using PV assembly mounting elements at the mounting element recesses. The mounting elements are configured so that they do not shade the PV assembly.

A further aspect of the invention is directed to an electric vehicle PV roof assembly comprising a vehicle roof having an upper surface with first and second surface portions. A PV assembly is mounted to the first surface portion and a global positioning device, such as the ground plane of a global positioning system or a global positioning system antenna, is mounted to the second surface portion. The vehicle roof may include an opening through which the wires from the global positioning device can pass. Further, the second surface portion of the upper surface may include raised portions so to provide ventilation regions between the PV assembly and the upper surface. The upper surface may also include a depression positioned to accommodate wires exiting the PV assembly.

A still further aspect of the invention is directed to an electric vehicle PV roof including a PV roof body having a PV assembly-supporting upper surface, a peripheral edge circumscribing the upper surface, and a peripheral gutter formed between the upper surface and the peripheral edge. The gutter has a chosen minimum depth below the upper surface. The chosen minimum depth may be at least about 6 mm and the width of the gutter may be at least about 3 mm.

Another aspect of the invention is directed to an electric vehicle roof comprising a roof body with front and rear edges and lateral side edges. Hand-hold recesses are formed into the lateral sides at chosen positions. Hand-hold elements are mounted within the hand-hold recesses at positions to provide a minimum gap between the hand-hold elements and the lateral sides. The minimum gap is preferably at least about 2.5 cm.

Other features and advantages of the invention will appear from the following description in which the preferred embodiments have been set forth in detail in conjunction with the accompanying drawings.

DESCRIPTION OF THE SPECIFIC EMBODIMENTS

Figure 1:
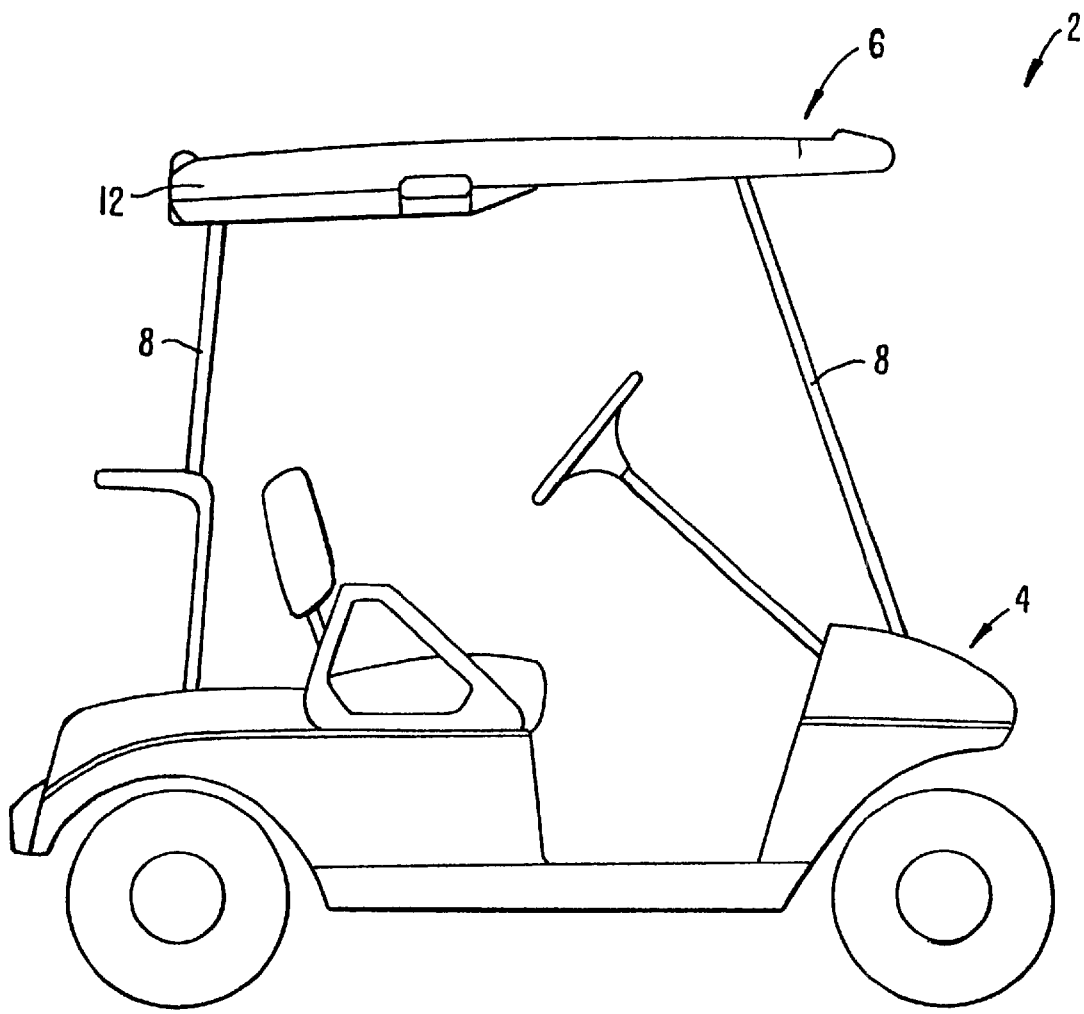
FIG. 1 is a side elevational view of a covered electric car incorporating a PV roof assembly made according to the invention.

FIG. 1 illustrates a covered electric car 2 including an electric car 4 covered by a PV roof assembly 6, the PV roof assembly 6 supported by a roof support framework 8. Electric car 2 may be a conventional electric car such as that made by Club Car, Inc., of Augusta, Ga. While PV roof assembly 6 will typically be used with golf car type of electric cars, can be used with other types of battery powered cars and vehicles which can be designed for use with one, two or more occupants. PV roof assembly 6 could also be used with, for example, hybrid vehicles which use both electricity and a fuel (such as gasoline or natural gas for an internal combustion engine) or with fuel cell-powered vehicles.

FIGS. 2, 2A–2C and 3 illustrate PV roof assembly 6. Assembly 6 includes a PV assembly 10 which is mountable to a roof 12. PV assembly 10 includes a PV panel 14 having a circumferential edge 16 surrounded by a generally C-shaped edge protector 18. Edge protector 18 is preferably made of rubber; it could also be made of other protective materials such as metal or plastic.

It is preferred that PV panel 14 be a monolithic PV panel. This eliminates many of the problems associated with conventional vehicle charging systems. That is, conventional solar charging systems often use several, typically three, conventional solar panels interconnected to one another to create a solar panel array. By using a single, monolithic PV panel, interconnections between individual panels are eliminated creating a system which can be stronger, less expensive and more reliable than multi-panel systems. PV panel 14 includes an array of individual PV cells 20 electrically coupled to one another in a desired pattern to provide the desired voltage and current output.

PV panel 14 is preferably a self-regulating voltage design. That is, PV panel 14 is specially designed to match the voltage characteristics of the electric car 4. This design maximizes electric current charge at low (discharge) battery voltages and self regulates (reduces) its charge at higher battery voltages. The self-regulation feature results from using an appropriate ratio of PV cells to individual battery cells. For crystalline and poly-crystalline photovoltaics, the preferred self regulation range is about 4.80 to 5.48 PV cells to battery cells, and more preferably about 5.10 to 5.40 PV cells to battery cells. For hybrid crystalline/thin-film photovoltaics, the preferred self regulation range is about 4.20 to 5.20 PV cells to battery cells, and more preferably about 4.40 to 5.00 PV cells to battery cells. For thin-film photovoltaics the preferred self-regulation range is about 4.10 to 5.50 PV cells to battery cells, and more preferably about 4.20 to 5.40 PV cells to battery cells. Accordingly, the self-regulation is achieved by the appropriate selection of the ratio of PV cells to battery cells which produces an optimal current for a given battery voltage condition.

Figures 2, 2C:
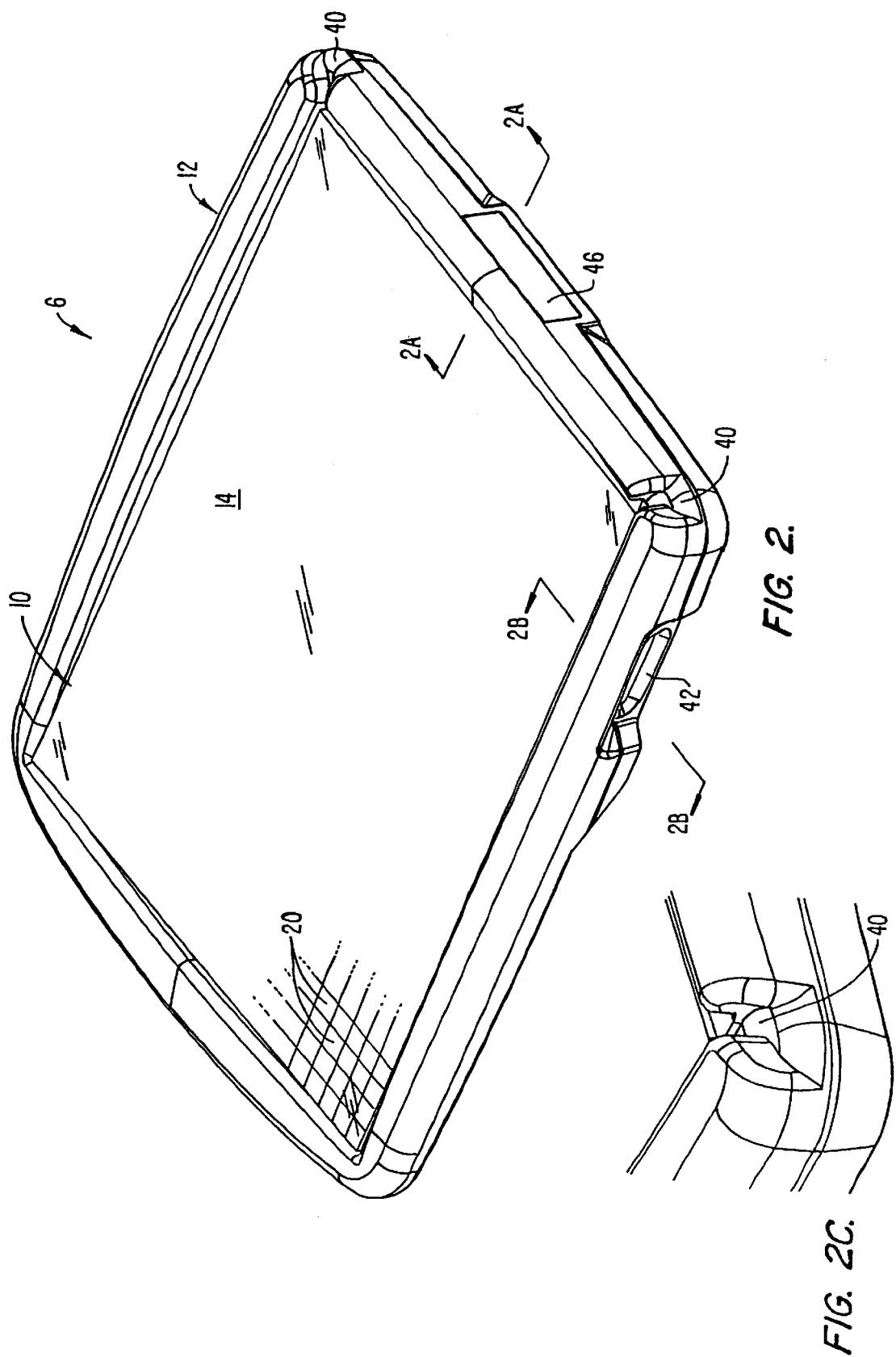
FIG. 2 is a top, rear, right side isometric view of the PV roof assembly of FIG. 1.
FIG. 2C is an enlarged view illustrating a rain gutter outlet along one of the back corners of the roof of FIG. 2.
Figure 2A:
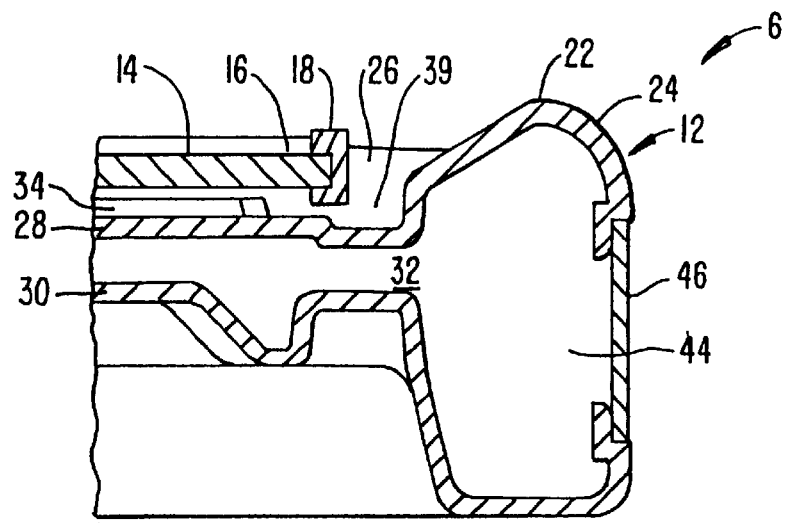
FIG. 2A is an enlarged cross-sectional view taken along line 2A—2A of FIG. 2 illustrating the closable trunk opening which opens into the interior of the roof.
Figure 2B:
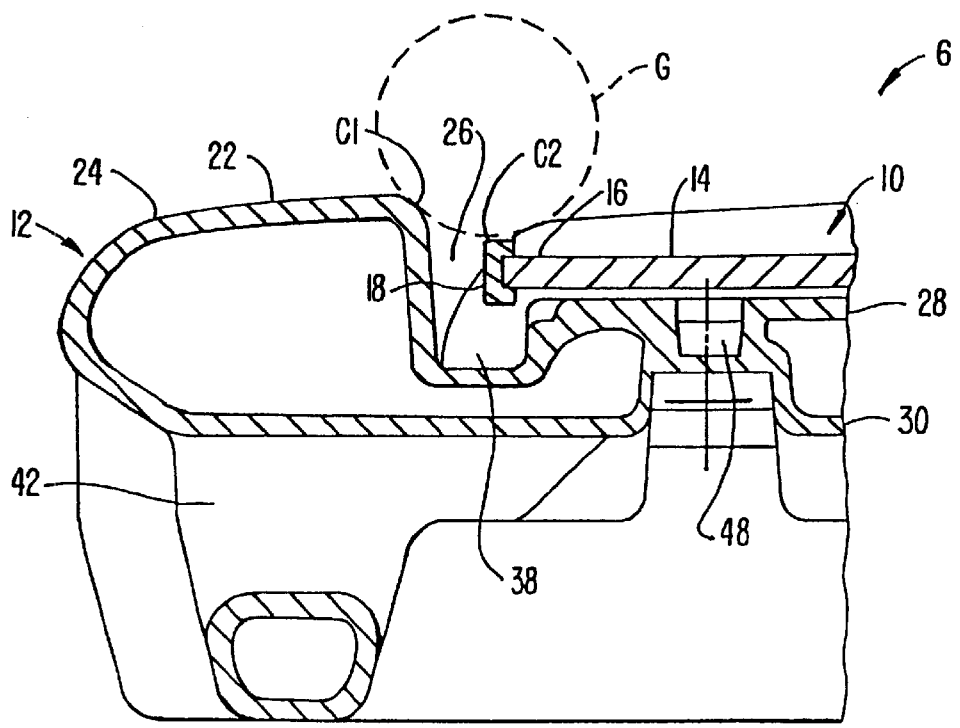
FIG. 2B is a cross-sectional view taken along line 2B—2B of FIG. 2 passing through one of the hand holds in the roof.
Figure 3:
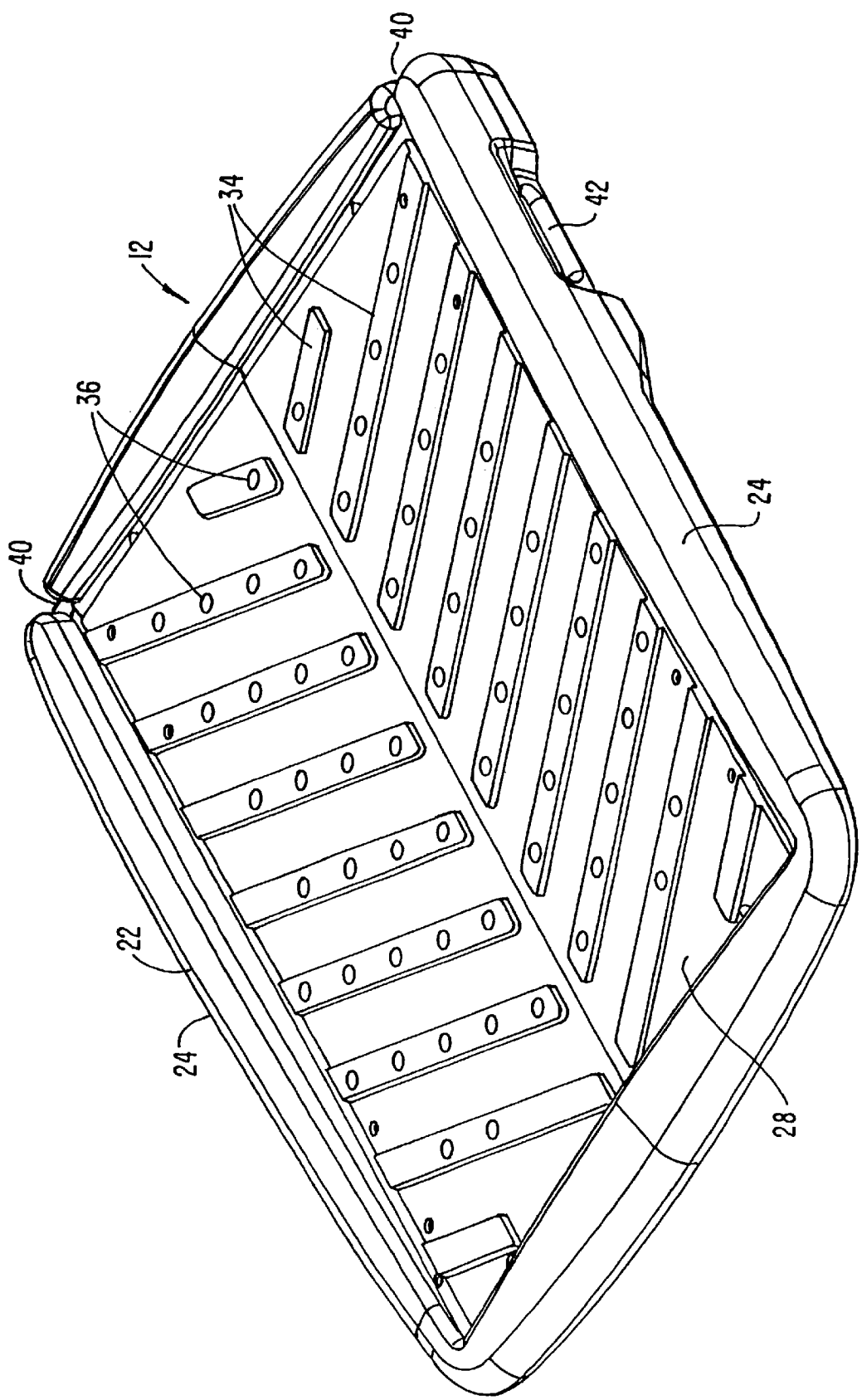
FIG. 3 is a top, front, left side isometric view of the roof of FIG. 2.

As seen in FIGS. 2A and 2B, circumferential edge 16 of PV panel 14 lies below the upper edge 22 of the circumferential lip 24 of roof 12. Therefore, in addition to edge protector 18, the circumferential edge 16 is also protected because its position relative to circumferential lip 24 is such that a golf ball G will not fit into the space 26 between the two. More preferably, the distance between corner C1 of lip 24 and corner C2 of edge 16 is less than the diameter of a conventional golf ball G, that is about 4.3 cm, such that a direct strike of a golf ball G on edge 16 is not possible; this may reduce or eliminate the need for edge protector 18.

Roof 12 includes an upper wall 28 and a lower wall 30 which defines a storage region 32 therebetween. Upper wall 28 has a herringbone pattern of upwardly extending supports 34. Supports 34 include numerous high bond-strength double-stick tape patches 36 used to secure PV assembly to roof 12. Tape patches 36 are preferable made of relatively thick, such as 0.47 mm (0.1875 inch) thick, somewhat spongy material to provide not only secure adhesion but also a certain amount of vibration isolation. Other techniques for securing PV assembly 10 to roof 12, such as using an adhesive, spring clips, shock mounts, threaded fasteners, clamps, etc., could also be used. Laterally-extending kiss-offs (not shown) provide separation between upper and lower walls 28, 30.

In addition to providing a mounting surface for PV panel 14, supports 34 also help to provide cooling air to the underside of PV panel 14. In addition, the herringbone pattern of supports 34 helps to guide water to rain gutters 38, 39, see FIGS. 2A and 2B, formed adjacent to lip 24 along the sides and ends of roof 12. Water empties from roof 12 through one or both gutter drains 40 shown in FIGS. 2 and 2C.

FIG. 2B illustrates a cross-sectional view taken through one of two hand holds 42. FIG. 2A is a cross-sectional view taken through the trunk opening 44 and trunk opening cover 46. Trunk opening 44 provides access to storage region 32 so that various accessories, such as a charge controller, a spray mist pump and reservoir (described below), or other things can be mounted within storage region 32 and yet permit access by, for example, one or more of the owner, the user and a service technician.

Figure 4:
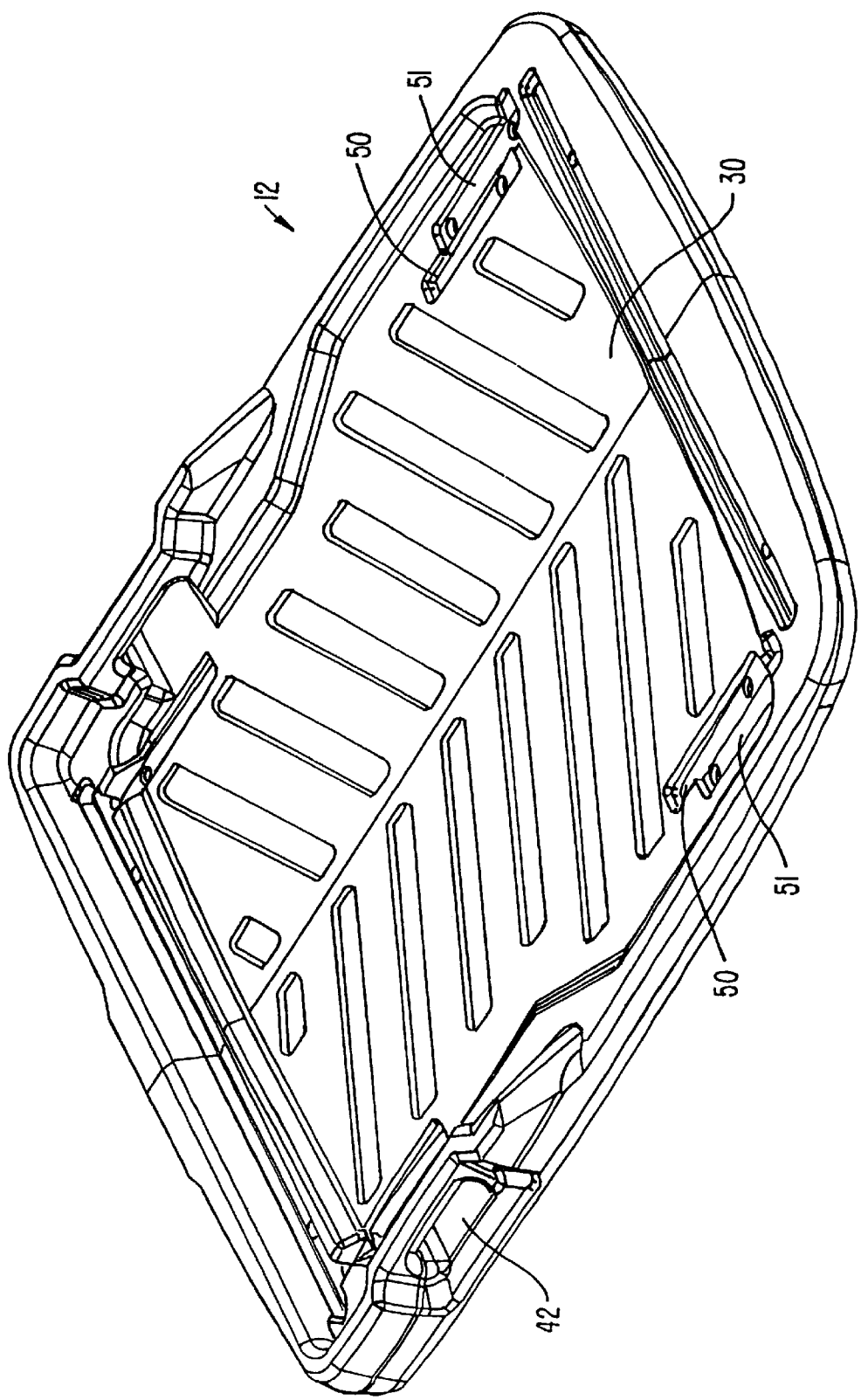
FIG. 4 is a bottom isometric view of the roof of FIG. 3.

FIG. 4 illustrates the underside of roof 12. Roof 12 is designed to be used with more than one brand of electric car 4 and is thus suitable for retrofit applications. To accommodate different types of roof support frameworks 8 for different brands of electric cars 4, different mounting recess, such as those identified as 50, 51, are provided along lower wall 30. FIG. 2B illustrates a cross-sectional view of a typical mounting recess 48 formed in roof 12. Other accommodations, such as brackets, removable or not, may be made to permit assembly 6 to be used with more than one type of electric car 4.

Figure 5:
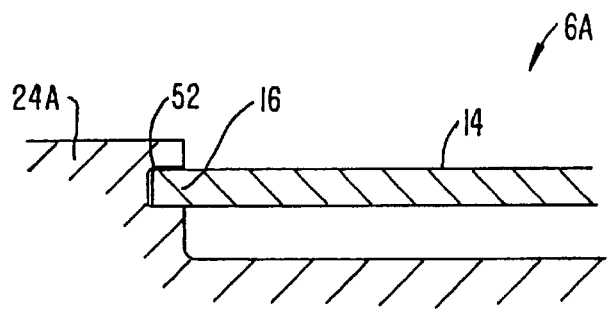
FIG. 5 illustrates an alternative embodiment of the invention in which the circumferential edge of the PV panel is captured within a circumferentially extending recess formed in the edge of the roof to help protect the edge of the PV panel.

The positioning of edge 16 relative to lip 24 and the use of edge protector 18 helps to protect circumferential edge 16 from damage. FIG. 5 illustrates, in simplified form, an alternative method for protecting circumferential edge 16 of PV panel 14 from damage. In the embodiment of FIG. 5, circumferential lip 24A includes a generally u-shaped recess 52 which houses circumferential edge 16 to support and to help prevent damage to the circumferential edge.

Figure 6:
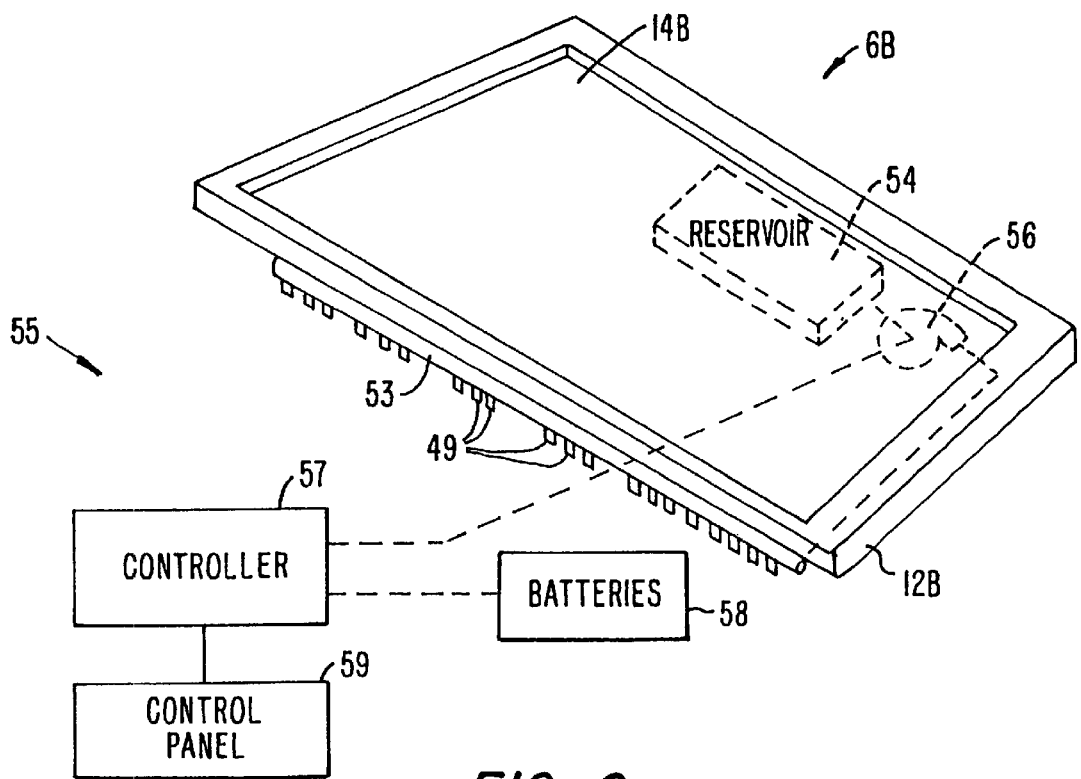
FIG. 6 is a simplified overall view of a PV roof assembly incorporating a misting system coupled to a controller.

FIG. 6 illustrates, in a very simplified form, a PV roof assembly 6B including misting pipes 53 (only one of which is shown) coupled to a water reservoir 54 housed within storage region 32 of roof 12B as parts of a misting system 55. Reservoir 54 could be, for example, made of a flexible bladder or a rigid container, or created by sealing off all or part of region 32. Misting pipes 53 include misting heads or nozzles 49 at appropriate locations along the misting pipes.

Misting system 55 also includes a pump 56 coupled to a controller 57. Controller 57 is also coupled to PV panel 14B and batteries 58 to control the charging functions. A control panel 59 is coupled to controller 57 to permit input to the controller and access to various operational parameters, such as battery charge level, charging rate, battery life, etc. Control panel 59 preferably includes a graphical display capable of displaying graphical and alphanumeric information to a user, typically to the driver of car 2, so to inform the user of, for example, energy production, pollution avoidance and battery state of charge.

Misting system 55 permits PV roof assembly 6 to provide not only solar charging of batteries 58, but also helps to provide a more pleasant environment for the ccupants during hot weather. Misting nozzles 49 may be placed at different locations on he PV roof assembly, the roof support framework and/or the car; for example, misters could be positioned at each corner of the PV roof assembly. Water reservoir 54 could be located on the car rather than the PV roof assembly. The tubes or pipes coupling water reservoir 54 to misting pipes 53, or other misters, could, for example, pass through hollow members of roof support framework 8 and between PV panel and upper wall 12. Misting system 55 could be completely manually controlled, automatically controlled or semi-automatically controlled. Automatic control could be based on one or more of ambient temperature and humidity, solar radiation intensity, whether the car is moving or is stopped, whether the car is occupied, etc. For example, the user could set system 55 to mist continuously only while the seat is occupied and the ambient temperature is above 30 C. (86 F.). Seat occupancy maybe sensed by, for example, a pressure sensor, a proximity sensor or an infrared detector, coupled to controller 57. The seat occupancy sensor may also be used in the control of, for example, radio volume or other passenger-sensitive aspects of car 2. System 55 could also include features to reduce excessive battery discharge, such as automatically shutting the misting system off after a prescribed period; this could also be used to prevent over misting.

Figure 7:
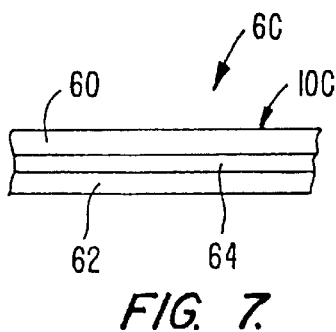
FIG. 7 is a simplified cross-sectional view of a portion of an alternative embodiment of the invention which the PV assembly constitutes the roof.

FIG. 7 illustrates in a simple schematic form, a section of a PV roof assembly 6C which includes no separate roof 12 as in the earlier embodiments. Rather, PV assembly 10C constitutes the roof. In this case, PV assembly 10 includes an upper, protective, at least semi-transparent, and preferable transparent, top layer 60, a bottom layer 62 and a PV layer 64 secured between an in contact with top and bottom layers 60, 62. PV layer 64 may be semi-transparent and bottom layer 62 may be transparent or semi-transparent so that roof assembly 6C can be semi-transparent. By the term semi-transparent it is meant to include layers which allow at least some light to pass through, such as surfaces which are partially transparent and partially opaque, partially translucent and partially opaque, and partially translucent and partially transparent.

Figure 8:
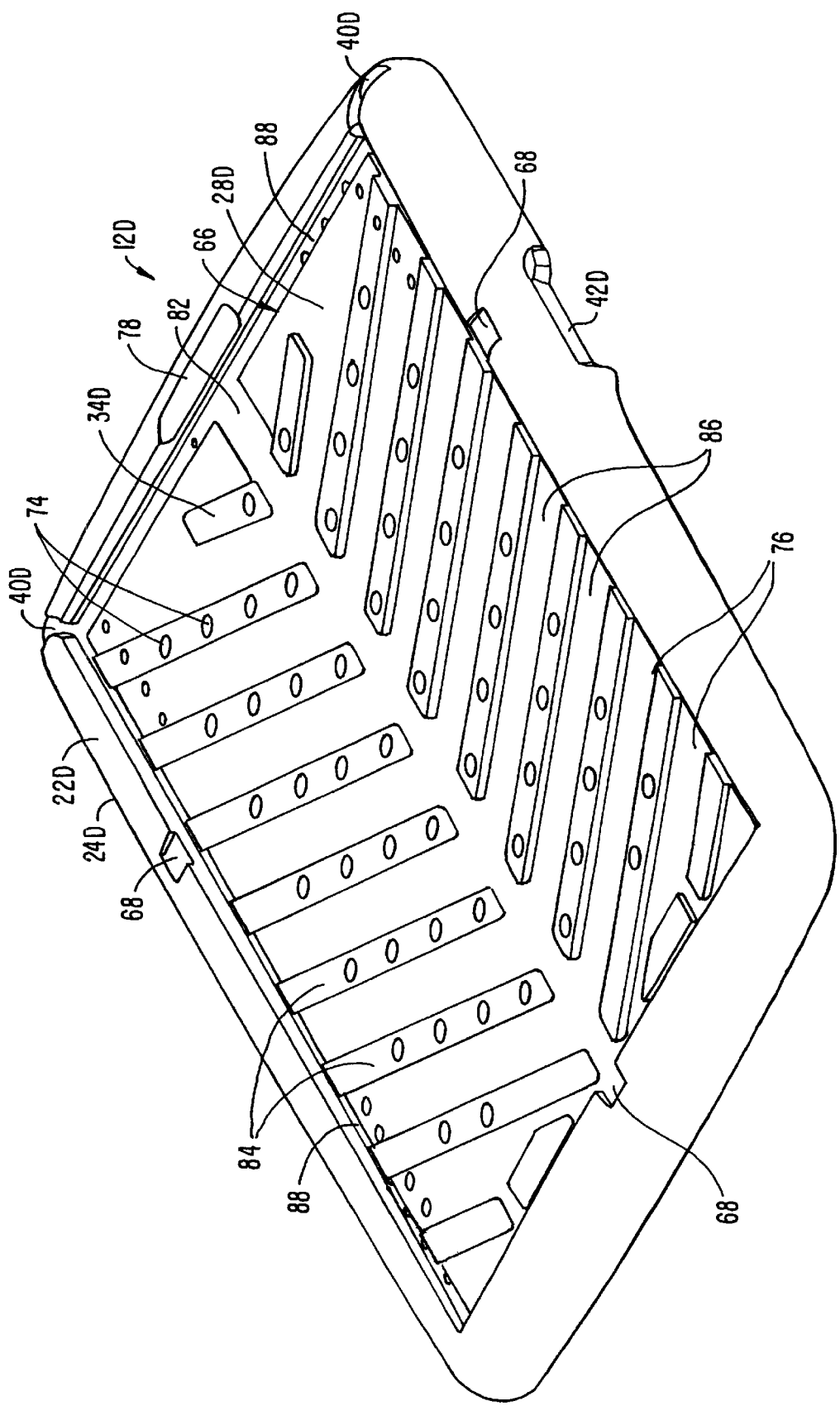
FIG. 8 is a top, front, left side isometric view of an alternative embodiment of the roof of FIG. 3.
Figure 8A:
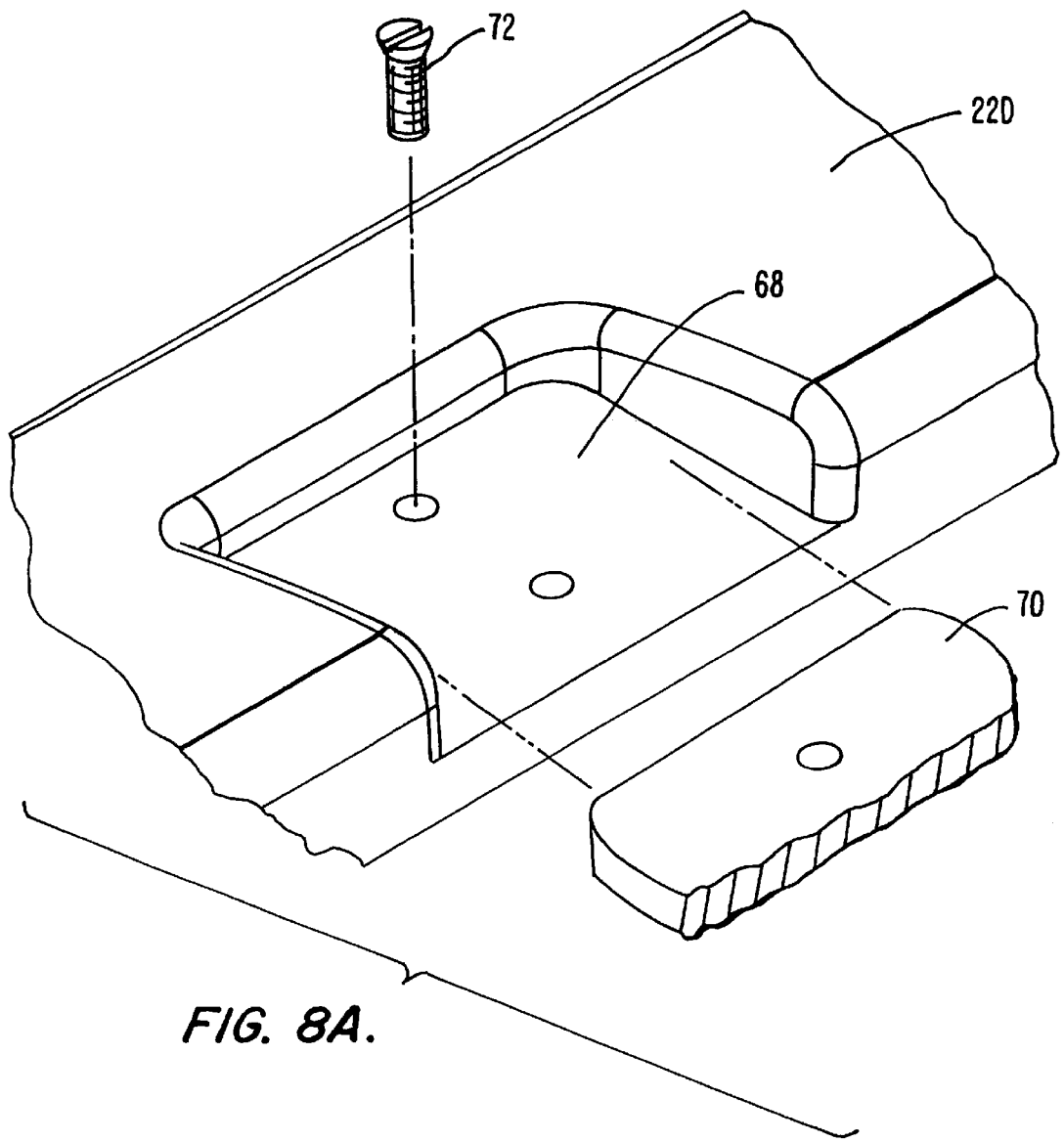
FIG. 8A is an enlarged view of a portion of the roof of the FIG. 8 illustrating a mounting element recesses.
Figure 9:
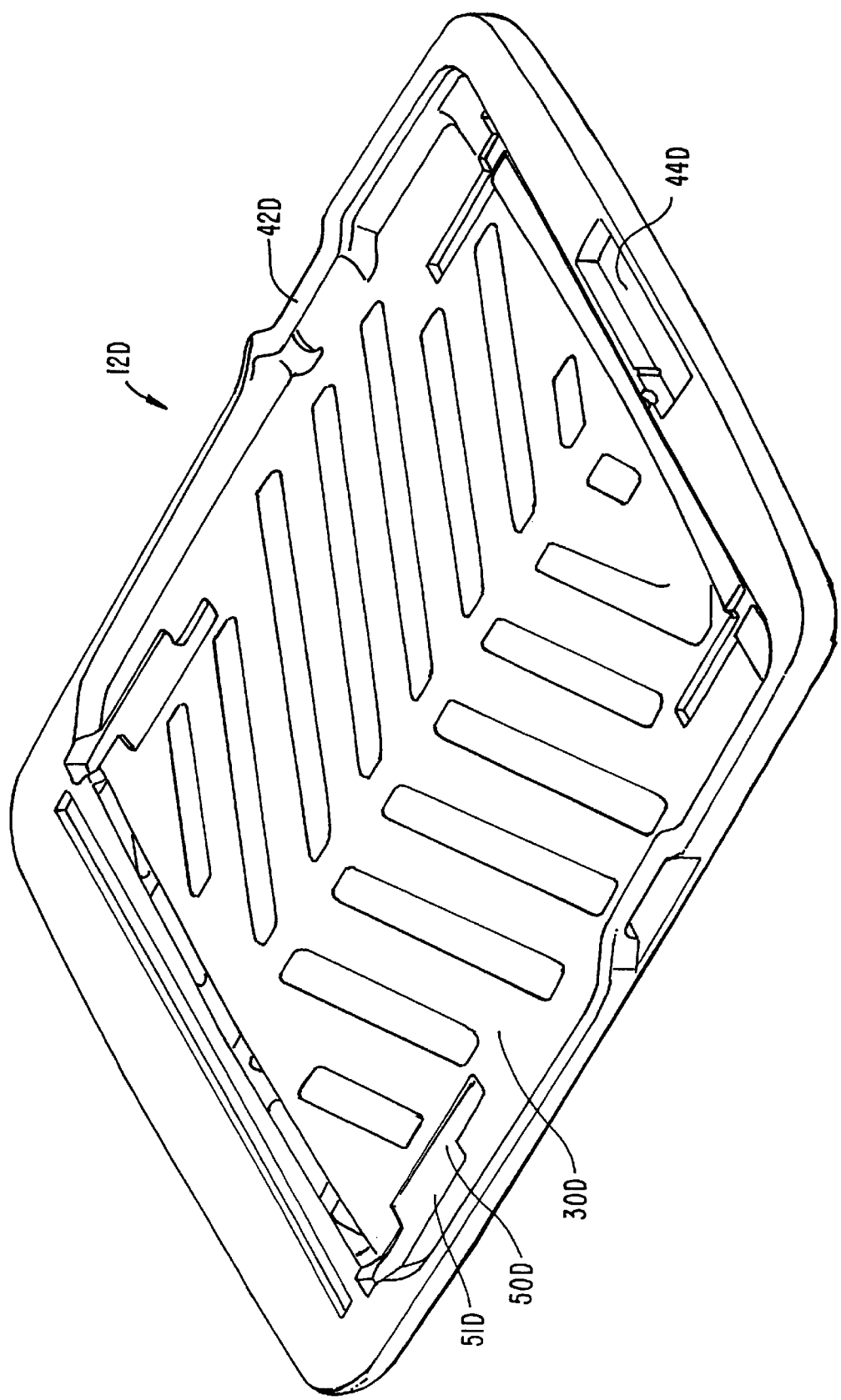
FIG. 9 as a bottom, rear, right side view of the roof of FIG. 8.

FIGS. 8–11 disclose an alternative embodiment of the invention incorporating several modifications to the above embodiments with like reference numerals referring to like features. FIG. 8 illustrates roof 12D from above. The upper surface 66 of roof 12D includes upper edge 22D into which three mounting element recesses 68 are formed. Tabs 70, see FIG. 8A, extending from PV panel 14D are positioned within recesses 68 for securing the PV panel to roof 12D using screws 72. Double sided tape, not shown, is placed along the upper surfaces 84 of the chevron-shaped supports 34D to help secure PV panel 14D in place. The raised nature of chevron-shaped supports 34D permits airflow within gaps formed between the bottom of PV panel 14D and the upper surface 86 of upper wall 28D. This helps to cool PV panel 14D. FIG. 8 also illustrates numerous standoff depressions 74 formed into supports 34D which extend to lower wall 30D. Also shown in FIG. 8 are numerous blinded counterbores 76; appropriate ones of the counterbores are drilled out according to the location of mounting hardware for the particular electric cart with which the roof assembly is used.

FIG. 8 also illustrates a flattened surface region 78 formed in upper surfaces 66 along the upper edge 22D at the front end of roof 12D. Surface region 78 is used to support a global positioning device 80, shown schematically in FIG. 10, such as the ground plane of a global positioning system or a global positioning antenna. One or more holes, not shown, may be formed in roof assembly 12D to permit wires from global positioning device 80 to pass therethrough. Such holes will typically be adjacent surface region 78. FIG. 8 also illustrates a depression 82 in upper surface 86 to accommodate wires exiting from PV panel 14D.

Figure 10:
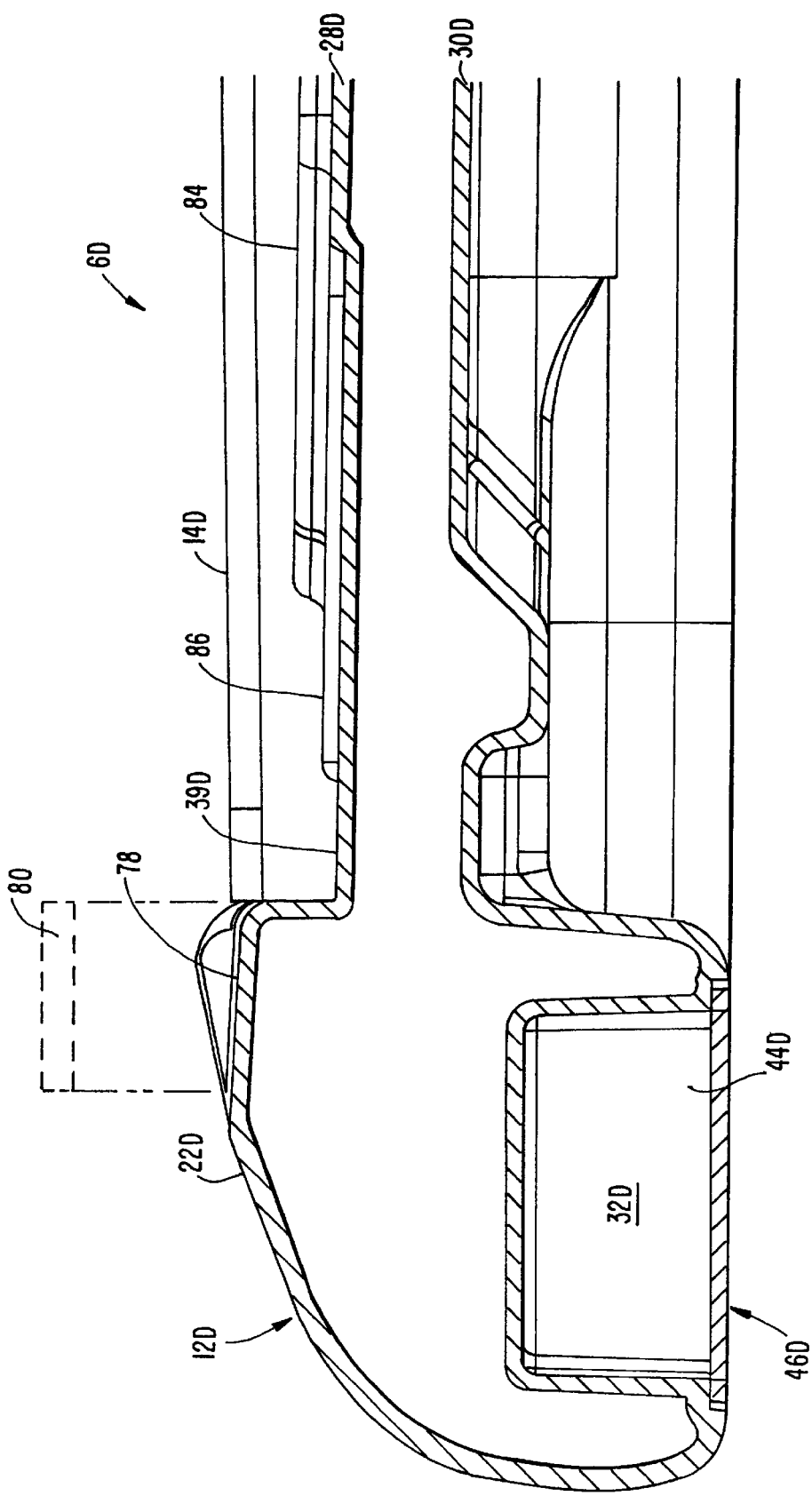
FIG. 10 is a cross-sectional view taken through the center of the rear edge of the roof of FIG. 8 similar to that of FIG. 2A.

Upper surface portion 86 of upper wall 28D lies between supports 34D and is circumscribed by a peripheral rain gutter 88. A portion of peripheral gutter 88, that is rain gutter 39D, extends between gutter drains 40D. Peripheral rain gutter 88 preferably has a minimum death below surface 86 of at least about 6 mm. Gutter 88 preferably has a minimum width of about 3 mm. FIG. 10 also illustrates the positioning of cover 46D along the underside of roof 12D as opposed to the positioning shown in FIG. 2A. This positioning helps to shield the contents of storage region 32 from the elements.

Figure 11:
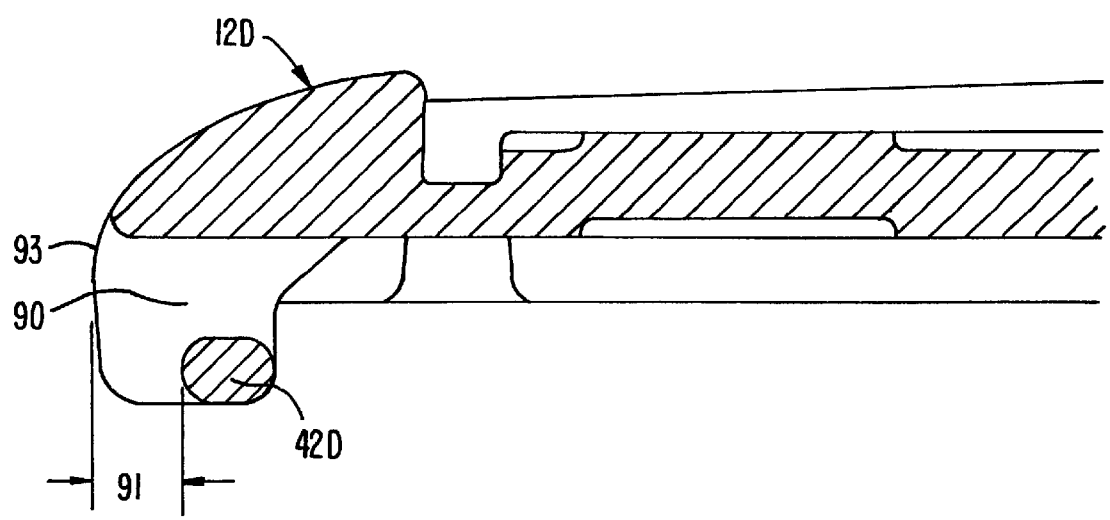
FIG. 11 is a cross-sectional view through a handhold of the roof of FIG. 8 similar to that of FIG. 2B.

FIG. 11 illustrates the location of handhold 42D within a handhold recesses 90. Handhold 42D has a minimum horizontal setback 91 of at least about 2.5 cm from the lateral sides 93 of roof 12D. The provision of horizontal setback 91 helps to prevent injury to a rider's hand as the cart passes close to, for example, a building, post, sign, or another cart. This is in contrast with conventional electric carts which often expose a rider's hands to injury when passing close to structures, objects or vehicles.

Figure 12:
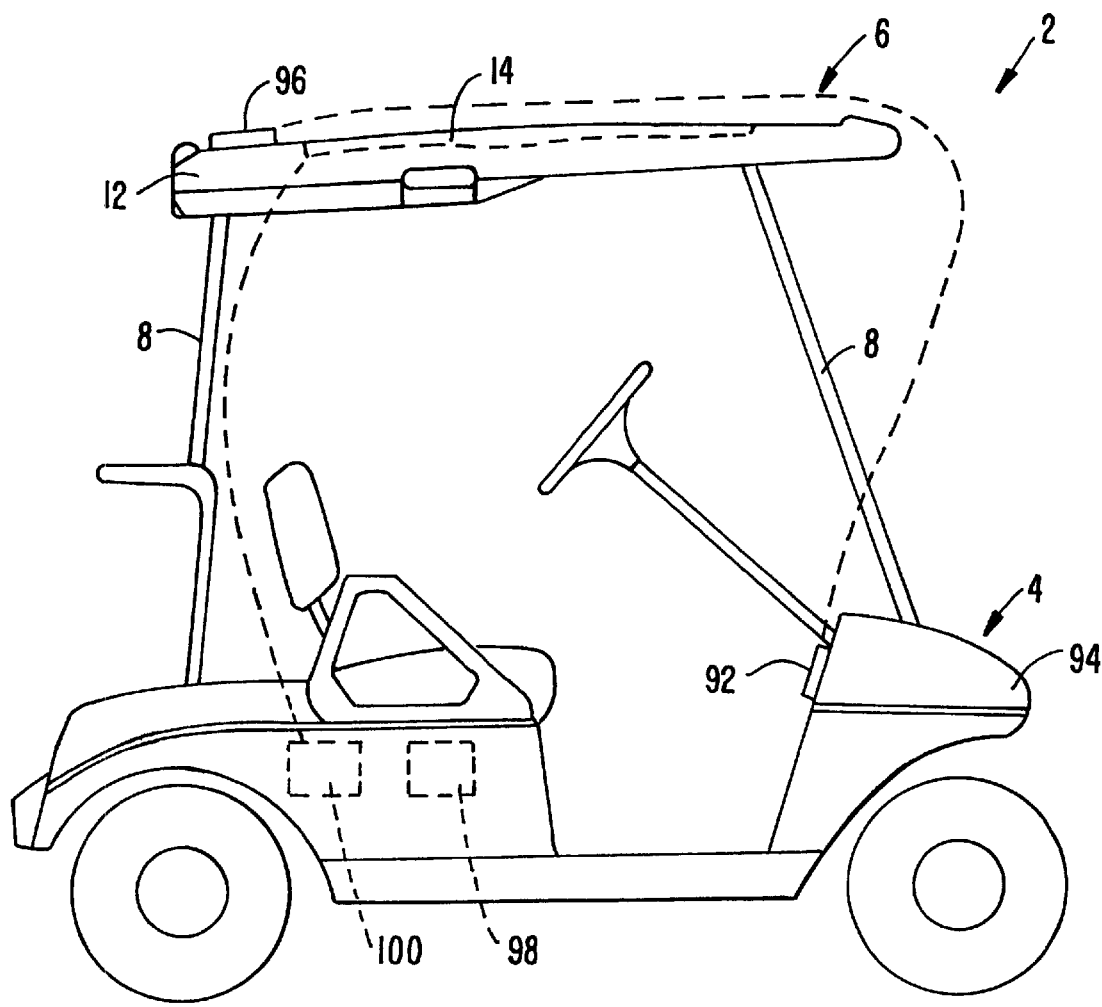
FIG. 12 is a side elevational view of a covered electric cart, similar to that of FIG. 1, incorporating a display unit coupled to a secondary PV assembly.

FIG. 12 illustrates the covered electric cart 2 of FIG. 1 with several additional features shown schematically. A display unit 92 is mounted to the vehicle body 94 at any convenient place, such as towards the front as shown in FIG. 12. Display unit 92 is connected to a secondary PV assembly 96 mounted to electric cart 2, typically on the roof assembly 6. Also shown schematically are a motor 98 and a battery 100 as is conventional. Battery 100 is coupled to PV panel 14 through an appropriate controller (not shown in FIG. 12). Display unit 92 may be of a variety of types, such as a light emitting diode display, a cathode ray tube display, an analog meter, or a liquid crystal display. Display unit 92 provides an indication proportional to the intensity of the solar irradiation on the secondary PV assembly 96. Display unit 92 is intentionally electrically isolated from battery 100 and main PV assembly 10. Using display unit 92 and a secondary PV assembly 96 to obtain an indication proportional to the intensity of the solar irradiation is simpler and less expensive than obtaining this information through the controller.

Modifications and variations can be made to the disclosed embodiments without departing from the subject of the invention as defined in the following claims.

Any and all patents, patent applications and printed publications referred to above are incorporated by reference.

What is claimed is:

1. An electric vehicle including a vehicle body carrying a motor, a battery and a main PV assembly, the main PV assembly coupled to the battery for charging the battery, the improvement comprising:

a display unit mounted to the body, the display unit electrically isolated from the battery and the main PV assembly; and a secondary PV assembly mounted to the body and electrically connected to the display unit;

the display unit constructed to provide an indication proportional to the intensity of solar irradiation on the secondary PV assembly.

2. The electric vehicle according to claim 1 wherein the display unit comprises at least one of a light emitting diode display, a cathode ray tube, an analog meter, and a liquid crystal display.

3. An electric vehicle photovoltaic (PV) roof assembly comprising:

a vehicle roof comprising an upper surface having a plurality of assembly mounting element recesses;

a PV assembly;

PV assembly mounting elements securing the PV assembly to the upper surface of the roof at the mounting element recesses;

said mounting elements configured so that the mounting elements do not shade the PV assembly; and said mounting elements comprising tabs extending from the PV assembly.

4. The assembly according to claim 3 wherein the mounting elements comprise screws passing through the tabs.

5. An electric vehicle photovoltaic (PV) roof assembly comprising:

a vehicle roof comprising an upper surface having first and second surface portions;

a PV assembly mounted to the first surface portion; and a global positioning device mounted to the second surface portion.

6. The assembly according to claim 5 wherein the global positioning device comprises at least one of a ground plane of a global positioning system and a global positioning antenna.

7. The assembly according to claim 6 wherein the vehicle roof comprises a through hole for the passage of wires from the global positioning device.

8. The assembly according to claim 7 wherein the second surface portion of the upper surface comprises raised portions so to provide ventilation regions between the PV assembly and the upper surface.

9. The assembly according to claim 5 wherein the upper surface comprises a depression positioned to accommodate wires exiting the PV assembly.

* * * * *